US010792570B2

(12) United States Patent
Russ et al.

(10) Patent No.: US 10,792,570 B2
(45) Date of Patent: Oct. 6, 2020

(54) IMPERSONAL BIOMETRIC IDENTIFICATION, TRACKING, AND GAMING SYSTEM

(71) Applicant: IGT, Las Vegas, NV (US)

(72) Inventors: Michael Russ, Graz (AT); Sven Aurich, Schwanberg (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/183,273

(22) Filed: Nov. 7, 2018

(65) Prior Publication Data

US 2020/0139252 A1 May 7, 2020

(51) Int. Cl.
*A63F 13/79* (2014.01)

(52) U.S. Cl.
CPC .................................. *A63F 13/79* (2014.09)

(58) Field of Classification Search
CPC ........................................................ A63F 13/79
See application file for complete search history.

(56) References Cited

U.S. PATENT DOCUMENTS

| 7,175,528 B1* | 2/2007 | Cumbers ................. G06F 21/31 235/380 |
| 2009/0176566 A1* | 7/2009 | Kelly ....................... G07F 17/32 463/29 |
| 2013/0016883 A1* | 1/2013 | Whillock ................ G06F 21/32 382/118 |
| 2013/0137516 A1* | 5/2013 | Griswold ............ G07F 17/3218 463/36 |

* cited by examiner

*Primary Examiner* — David L Lewis
*Assistant Examiner* — Shauna-Kay Hall
(74) *Attorney, Agent, or Firm* — Sheridan Ross P.C.

(57) ABSTRACT

The present disclosure relates generally to gaming systems and, in particular, to creating an impersonal player identification (ID) using biometric information obtained from a player in a gaming facility. In one example, a player is scanned at a gaming device and an impersonal player ID and gaming account is generated for the user without requiring identity information about the player other than the biometric information for the player. The impersonal player ID associates stored gaming history, award information, and offers for the player. As the player moves within the gaming facility, the player can access various functions of gaming devices by entering a biometric feature scanning zone. Aspects of the present disclosure allow player to securely redeem issued tickets/vouchers as well as interact with gaming devices without the need to carry tracking cards, fobs, or other physical tokens.

20 Claims, 7 Drawing Sheets

IMPERSONAL BIOMETRIC IDENTIFICATION, TRACKING, AND GAMING SYSTEM

BACKGROUND

The present disclosure is generally directed to biometric tracking systems, in particular, toward tracking players in a casino using biometric information.

Players in a casino generally access the functionality of gaming devices, such as electronic gaming machines, and the like, by using cash, coins, tracking cards, or other physical tokens. Physical tokens, such as player tracking cards, can include a gaming credit amount, information about the player, or other gaming information.

BRIEF SUMMARY

In certain embodiments, the present disclosure relates to a system, device, and method used to enable and track gaming, as well as rewards, based on an impersonal biometric identification of a player. In some embodiments, an impersonal biometric identification system of a gaming facility is provided, comprising: a biometric feature scanning device; a processor coupled to the biometric feature scanning device; and a memory coupled with and readable by the processor and storing therein a set of instructions that, when executed by the processor, causes the processor to: initiate, via the biometric feature scanning device, a biometric scan of an individual within a scanning zone of the biometric feature scanning device; receive, from the biometric feature scanning device and based on the biometric scan, biometric information for the individual; and store the biometric information for the individual in a memory location for the individual on a memory device, wherein information in the memory location for the individual is associated with an impersonal player identification (ID) that uniquely identifies the individual without any identity information other than the biometric information for the individual.

In some embodiments, a method for generating gaming device transferable gaming information using impersonal biometric information for individuals interacting with a gaming facility is provided, comprising: scanning, by a biometric feature scanning device, an individual within a scanning zone of the biometric feature scanning device for biometric information; receiving, by a processor, from the biometric feature scanning device, the biometric information for the individual; and storing, by the processor, the biometric information for the individual in a memory location for the individual on a memory device, wherein information in the memory location for the individual is associated with an impersonal player ID that uniquely identifies the individual without any identity information other than the biometric information for the individual.

In some embodiments, a computer gaming device is provided comprising: a biometric scanner; a processor coupled to the biometric scanner; and a memory coupled with and readable by the processor and storing therein a set of instructions that, when executed by the processor, causes the processor to: scan, via the biometric feature scanning device, biometric features of a person within a scanning zone of the biometric feature scanning device; receive, based on the scan, biometric information defining a relationship between the biometric features of the person scanned; determine whether the biometric information of the person scanned is stored in a memory device, wherein the memory device comprises separate memory locations for previously recognized players at a gaming facility, wherein the previously recognized players are each identified by a unique impersonal player ID, and wherein the memory device does not link to identity information for the previously recognized players and does not comprise any identity information for the previously recognized players other than biometric information for the previously recognized player; and in response to determining the biometric information for the person scanned is not stored in the memory device, store the biometric information of the person scanned in a memory location for the person in the memory device, wherein the memory device does not link to identity information for the person and does not comprise any identity information for the person other than the biometric information of the person scanned.

Additional features and advantages are described herein and will be apparent from the following Description and the figures.

DETAILED DESCRIPTION

Figure 1:
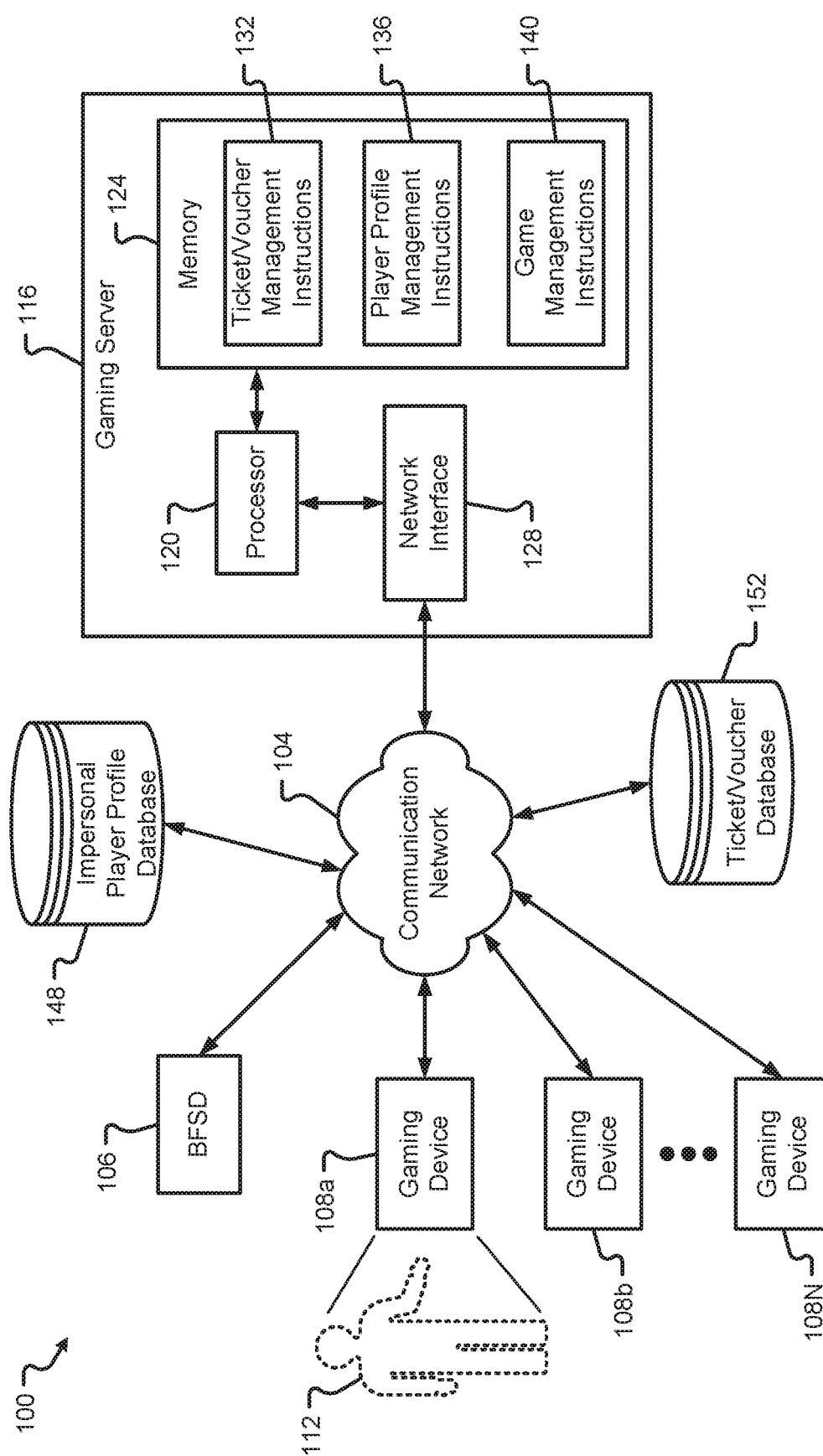
FIG. 1 is a block diagram of a gaming system accordance with embodiments of the present disclosure.

Embodiments of the present disclosure will be described in connection with a gaming system having one or multiple gaming devices that enable gaming activity. While certain embodiments of the present disclosure will reference the use of an Electronic Gaming Machine (EGM) as a device that enables players to participate in gaming activity, it should be appreciated that embodiments of the present disclosure are not so limited. For instance, any computing device, personal gaming device, or collection of computing devices may be used to facilitate player engagement with a gaming system.

Embodiments of the present disclosure provide systems and methods that use biometric information (e.g., obtained via fingerprint scan, iris scan, retinal scan, thermal imaging, facial scan, etc.) along with impersonal data (e.g., information that is absent any private information such as an individual's name, address, etc.) for an individual in a casino environment. In some embodiments, players may have their biometric identification, or information, scanned, which allows the players to enable the functionality of gaming devices and/or receive awards without needing to carry player tracking cards, physical tokens, or other physical devices/items with them. The methods and systems described herein provide cross-device functionality when an individual is scanned at different gaming devices, stations, and/or places in the casino environment (e.g., confirming the individual's presence based on a biometric identification for the individual, etc.). Among other things, embodiments of the present disclosure address several technical problems associated with the use of physical tokens in accessing the functionality of a gaming device. For instance, the use of cash and coins, while convenient, requires a player to carry an appropriate amount of money to support a desired gaming session. Physical tokens (e.g., player tracking cards, credit cards, fobs, etc.) generally include gaming credits and sensitive information about a player. Unfortunately, these physical tokens can be easily misplaced, lost, or stolen. Once lost or stolen, the physical tokens can be used by anyone to access any remaining gaming credit, retrieve awards, or continue to access gaming devices with the physical tokens. The same security issues surrounding these physical tokens also apply to issued reward tickets, or vouchers. The embodiments disclosed herein remove the need for carrying cash, coins, tracking cards, authorization devices, or other physical tokens in a gaming environment by using biometric information of a player that is linked to an impersonal gaming account.

It is an aspect of the present disclosure that a player may create a new impersonal gaming account by scanning their biometrics at a biometric feature scanning device, or scanner. The biometric information from the scan may be tagged with an impersonal player identification (ID), such as an ongoing, or incrementing, number for each new impersonal gaming account, an ID with a timestamp and/or a date stamp, or any other information for assigning an ID that is absent identity information. Biometric identification systems associate biometric information obtained from a person with other identity information such as the person's name, address, social security number, national identification number, and/or some other personal information about the person that can be used to determine an identity of the person. This information may be considered "sensitive" and, in some jurisdictions, must be protected. In contrast to the conventional combined identity information identification systems, embodiments of the present disclosure create an impersonal gaming account for a player based on the player's public, or non-sensitive, biometric information (e.g., facial features, fingerprints, iris features, etc.). The impersonal gaming account may only include information that is relevant to gaming for the player and, in some embodiments, may not include sensitive identity information that could be used to determine an identity of the person. In some embodiments, the impersonal gaming account may be restricted from including, or linking to, any additional identity information other than the biometric information. The only identity information in an impersonal gaming account may be the biometric information obtained from a person that is used to identify an impersonal gaming account associated with, and/or assigned to, the user. In this example, no other information associated with the impersonal gaming account could be used to determine an identity of the person. While this biometric information may identify an impersonal gaming account that is associated with the person, the biometric information alone (e.g., without other additional identity information, etc.) may not determine an identity of the person.

Once an impersonal gaming account is created, data collected over time may be associated with the impersonal player ID that is saved with the impersonal gaming account. In some cases, data collected may be shared with the player (e.g., restoring game progress of the last gaming session for the player, etc.). Some data may be tracked and utilized for any purpose (e.g., record which games the player plays most often or most likely and, thus, may be used to suggest newly released games of a similar kind to the player, etc.).

In some embodiments, the impersonal player ID for a player may be saved on remote servers, on casino-internal servers, or on wider area servers such as within a casino group, a state, area, international region, etc. The impersonal player ID may be stored locally on and optionally transferred from a device (such as a particular biometric feature scanning device or a gaming device comprising a biometric scanning device, etc.) to one or more remote servers using wired or wireless network technologies. The impersonal player ID may be retrieved by the same device or another device being part of the network. Additionally or alternatively, real-time bidirectional communication between the one or more devices with the one or more remote servers may be considered. For example, when a player logs into a first gaming device using the biometric information associated with an impersonal player ID, a "logged-in status" may be sent by the first gaming device to a remote server. Continuing this example, when the player attempts to log into a second gaming device in the same manner, the second gaming device may request data from the remote server and, depending on allowed gaming variations, may inform the player that the impersonal player ID is already in use at the first gaming device.

Progress made by a player may be saved to the impersonal gaming account associated with the impersonal player ID and/or restored/retrieved at any other gaming device in the gaming network that the player logs into. In one embodiment, the gaming device may be of the same kind (e.g., the same game, same type of cabinet, etc.) as a previous gaming device, be of a different kind (e.g., another game on another cabinet, etc.), or even be an entirely different type of gaming device such as a mobile device, smartphone, etc.

In any event, the embodiments described herein disclose an entirely new system of player identification that allows cross-device play functionalities for a player, offers personalization (e.g., preferences, settings, etc.) and advertising abilities by collecting player-related gaming data over time, and impersonalized special attraction offerings for players while maintaining a players identity information, privacy, and in some cases, anonymity.

The term "impersonal biometric identification" may refer to the use of a biometric identification system (such as a fingerprint scanning device, iris or retinal scanning device, face scanning device, etc.) to accurately determine one person from another in a gaming system without attaching the biometric information to a scanned individual's private, or other personal, information (e.g., such as the individual's name, an address, contact information, or other identity information). Although the biometric information may be considered to qualify as identity information, the biometric information (e.g., fingerprints, facial features, iris features, etc.) of a person is not necessarily hidden from the public. The impersonal biometric identification may be stored without including, or even linking to, additional identity information (e.g., names, social security numbers, national identification numbers, credit card numbers, physical addresses, phone numbers, email addresses, IP addresses, passport number, date of birth, genetic information, birthplace, personally identifiable information (PII), etc.). In some embodiments, the impersonal gaming accounts described herein may be absent any PII, or link to PII, as defined by the General Data Protection Regulation (GDPR), NIST Special Publication 800-122, etc., other than the biometric information obtained from a person. In one embodiment, the only identity information included in the impersonal gaming account may be a player's biometric information stored in a template that defines relationships (e.g., distances, sizes, etc.) between, and of, biometric features of the player. Storing the player's biometric information in a template, among other things, does not allow an identifiable image or a reconstruction of the person to be recreated. Through using impersonal identification, it can be determined whether or not person X, who is scanned at a first gaming device, is the same person X who is scanned at the same or another gaming device. However, it cannot be determined that person X's name is Patrick, that he lives in North America, or that he has a mailing address of XYZ.

Embodiments of the present disclosure focus on impersonal biometric identification and not on personal biometric identification.

At least some benefits of the impersonal identification (e.g., compared to personal identification and/or play tracking cards or other loyalty items) include, but are in no way limited to, not needing to verify contact information when scanning a person's biometrics, providing easy and fast account creation (e.g., the player is just an impersonal ID and does not have a name, so there is no need for signatures or other confirmations, etc.), the account may even be created without letting the player know of the account creation, providing easy and fast account login (e.g., without the need to carry along any items such as a player card or other gadgets, etc.) the login can even happen without letting the player know. Additionally or alternatively, the player intended to be addressed based on the impersonal player ID is the actual person to be addressed compared with a tracking card or other gadgets that might be lost, stolen, or transferred to other individuals. For instance, if a person is intended to personally read an informative message, requiring a confirmation (click "Confirm", etc.), it is far more likely that the person intended to read the message is the person who confirmed the message (compared to a loyalty card that a player can give someone else).

The present disclosure describes the use of a system in a casino environment, focusing on cross-device transfers, enabled and/or eased by using impersonal biometric identification. There are several use cases describing the transfer of data between devices of the same kind as well as devices of a different kind.

In some embodiments, the creation of an impersonal player ID and gaming account may happen on purpose, where a player chooses to "login" and progress through a login/account creation procedure. Additionally or alternatively, the creation of an impersonal player ID and gaming account may be made "on the side" without the player's knowledge. For instance, the player does not need to know there is a biometric scanner that automatically scans the player's biometrics and checks to determine if an impersonal player ID is already assigned. Among other things, because the system is not collecting identity information for the player, the player need not be informed of the impersonal gaming account creation. If no impersonal player ID is already assigned to the player, the impersonal gaming account might be created automatically. The biometric scanner may continually scan the player over time to make sure the player at the gaming device is still the same player. Thus, the scanner will realize when a player left the gaming device or when another player approaches the gaming device.

The biometric feature scanning devices may include, but are in no way limited to, scanners at a casino entrance, on the casino floor or at special spots of interest, integrated into a gaming device (such as an EGM, etc.), from mobile devices, and/or mobile scanners carried by casino staff.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. For instance, the components of a server may be distributed amongst a plurality of servers and/or other devices (e.g., an EGM, portable user device, etc.) in the system 100 without departing from the scope of the present disclosure.

The gaming system 100 is shown to include a communication network 104 that interconnects and facilitates machine-to-machine communications between one or multiple biometric feature scanning devices 106 and/or gaming devices 108a-N and a gaming server 116. It should be appreciated that the communication network 104 may correspond to one or many communication networks without departing from the scope of the present disclosure. In some embodiments, the biometric feature scanning devices 106 and/or gaming devices 108a-N and server(s) 116 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the biometric feature scanning devices 106 and/or the gaming devices 108a-N may be distributed throughout a single property or premises (e.g., a single casino floor) or the biometric feature scanning devices 106 and/or the gaming devices 108a-N may be distributed among a plurality of different properties. In a situation where the biometric feature scanning devices 106 and/or gaming devices 108*a*-N are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The biometric feature scanning devices 106 and/or the gaming devices 108*a*-N may utilize the same or different types of communication protocols to connect with the communication network 104. It should also be appreciated that the gaming devices 108*a*-N may or may not present the same type of game to a player 112. For instance, the first gaming device 108*a* may correspond to a gaming machine that presents a slot game to the player 112, the second gaming device 108*b* may correspond to a video poker machine, and other gaming devices may present other types of games or a plurality of different games for selection and eventual play by the player 112. It may be possible for the some of the biometric feature scanning devices 106 and/or gaming devices 108*a*-N to communicate with one another via the communication network 104. In some embodiments, one or more of the gaming devices 108*a*-N may only be configured to communicate with a centralized management server and/or the gaming server 116. Although not depicted, the system 100 may include a separate server or collection of servers that are responsible for managing the operation of the various biometric feature scanning devices 106 and/or gaming devices 108*a*-N in the gaming system 100. It should also be appreciated that the gaming server 116 may or may not be co-located with one or more gaming devices 108*a*-N in the same property or premises. Thus, one or more biometric feature scanning devices 106 and/or gaming devices 108*a*-N may communicate with the gaming server 116 over a WAN, such as the Internet. In such an event, a tunneling protocol or Virtual Private Network (VPN) may be established over some of the communication network 104 to ensure that communications between a gaming device (e.g., an EGM, etc.) and a remotely-located server 116 are secured.

The biometric feature scanning devices 106 may correspond to a type of device that scans biometric features of an individual within a scanning zone of the biometric feature scanning devices 106. Biometric features may include an individual's facial features (e.g. the eyes, nose, mouth, ears, chin, etc.), fingerprint features (e.g., loop, whorl, arch, ridge, valley, etc.), temperature signature (e.g., body heat pattern, temperature profile, etc.), eye features (e.g., iris, retinal, or other information), voice features (e.g., speaker recognition, tone, voice biometrics, etc.) and/or other biometric features associated with a human. In some embodiments, the biometric feature scanning device 106 may be configured to detect one or more of the biometric features (e.g., facial, fingerprint, iris/retinal, etc.) associated with a human. Examples of biometric feature scanning devices 106 may include, but are in no way limited to, a facial recognition system, a fingerprint scanner/reader, iris scanning system, voice recognition system, and/or combinations thereof.

In addition to detecting a biometric feature of a player 112, the biometric feature scanning device 106 may record biometric information of the features corresponding to, for example, the type, size, area, relationship, distances, and/or aspect ratio of one or more of the player's 112 biometric features. This information may be saved in a memory location of a database 148 in lieu of an image of the biometric feature itself. Among other things, this approach allows the gaming system 100 to determine an impersonal identification of a player 112 based on the biometric information without using identity information about the player 112 such as photos, videos, or actual print images (e.g., fingerprint, iris, retinal, etc.). It is an aspect of the present disclosure that one or more biometric feature scanning devices 106 may be attached to, or incorporated in, a gaming device 108. In some embodiments, the biometric feature scanning device 106 may operate as stand-alone kiosk, identification system, or preauthorization machine (e.g., apart from a gaming device 108) in a gaming system 100.

The gaming devices 108*a*-N may correspond to a type of device that enables player 112 interaction in connection with playing games of chance. A gaming device 108*a*-N may include any type of known gaming device such as an EGM, a slot machine, a table game, an electronic table game (e.g., video poker), a skill-based game, a mobile device, etc. In addition to playing games on a gaming device 108*a*-N, the player 112 may also be allowed to interact with and play games of chance on a mobile device. A mobile device may correspond to a player's 112 personal device or to a device issued to the player 112 during the player's visit at a particular casino. It should be appreciated that the player 112 may play games directly on their mobile device and/or the mobile device may be in communication with a gaming device 108*a*-N such that the mobile device provides the interface for the player 112 to the gaming device 108*a*-N. As shown in FIG. 1, the mobile device may be in communication with the communication network 104 or in direct communication (e.g., via Bluetooth, WiFi, etc.) with a gaming device 108*a*-N. Non-limiting examples of a mobile device include a cellular phone, a smart phone, a tablet, a wearable device, an augmented reality headset, a virtual reality headset, a laptop, a Personal Computer (PC), or the like.

The gaming server 116 is further shown to include a processor 120, memory 124, and a network interface 128. These resources may enable functionality of the gaming server 116 as will be described herein. For instance, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data into an impersonal player profile database 148 and/or ticket/voucher database 152 and retrieve information from the databases 148, 152. Alternatively or additionally, the impersonal player profile database 148 or data stored therein may be stored internal to the server 116 (e.g., within the memory 124 of the server 116 rather than in a separate database). Alternatively or additionally, the ticket/voucher database 152 or data stored therein may be stored internal to the server 116.

The illustrative instruction sets that may be stored in memory 124 include, without limitation, a ticket/voucher management instruction set 132, a player profile management instruction set 136, and a game management instruction set 140. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the ticket/voucher management instruction set 132, when executed by the processor 120, may enable the gaming server 116 to manage various tickets/vouchers issued by gaming devices 108*a*-N, manage ticket/voucher values, determine ticket/voucher states, update the ticket/voucher database 152, obtain information from the ticket/voucher database 152, determine that a ticket/voucher has been redeemed and notify the player profile management instruction set 136, etc. In some embodiments, the ticket/voucher management instruction set 132 is configured to perform any action consistent with the issuance of tickets/vouchers, tracking of ticket/voucher states, and redeeming of tickets/vouchers, namely, determining whether a ticket/voucher has been redeemed by the player 112 to whom the ticket/voucher was issued. In some embodiments, the ticket/voucher management instruction set 132 may be configured to generate, or cause the game management instruction set 140 to generate, a synthesized credit meter for the first gaming device. For instance, as gaming devices 108*a*-N or a mobile device have their credit meters updated, the gaming server 116 may update a corresponding synthesized credit meter to reflect updates at the credit meters. In some embodiments, values of credit or other events stored in credit meters of devices 108 may be mirrored in a synthesized credit meter maintained by the gaming server 116.

The player profile management instruction set 136, when executed by the processor 120, may enable the gaming server 116 to manage one or more player profiles within the impersonal player profile database 148. In some embodiments, the player profile management instruction set 136 may be configured to manage gaming credits, gaming history, offers enrolled in and/or received by a player 112, devices used by the player 112, and store impersonal biometric information for a player 112. In some embodiments, the player profile management instructions 136 may be configured to manage settings for each player profile, available wager credits for such profiles, determine player wager history, and/or determine which, if any, tickets/vouchers are associated with a particular impersonal player ID. It should also be appreciated that the player profile management instruction set 136 may be configured to manage player profiles of players that do not have loyalty accounts or any other predetermined player account.

The game management instruction set 140, when executed by the processor 120, may enable the gaming server 116 to manage the various games played by a player 112 at the gaming devices 108*a*-N and/or a mobile device carried by the player 112. In other words, any game played by the player 112 at one or more of the devices 108*a*-N may be managed, partially or entirely, by execution of the game management instruction set 140. The game management instruction set 140 may also be configured to track a status of wager events (e.g., sporting events, bingo, keno, lottery, etc.) and whether a player 112 has placed a wager on such events. In some embodiments, when a wager event has come to completion such that wagers made on the event become payable (e.g., at the end of a sporting event when the final score of the event is determined), the game management instruction set 140 may notify the ticket/voucher management instruction set 132, thereby enabling the ticket/voucher management instruction set 132 to update states and/or values of tickets/vouchers issued for the event appropriately.

Figure 2:
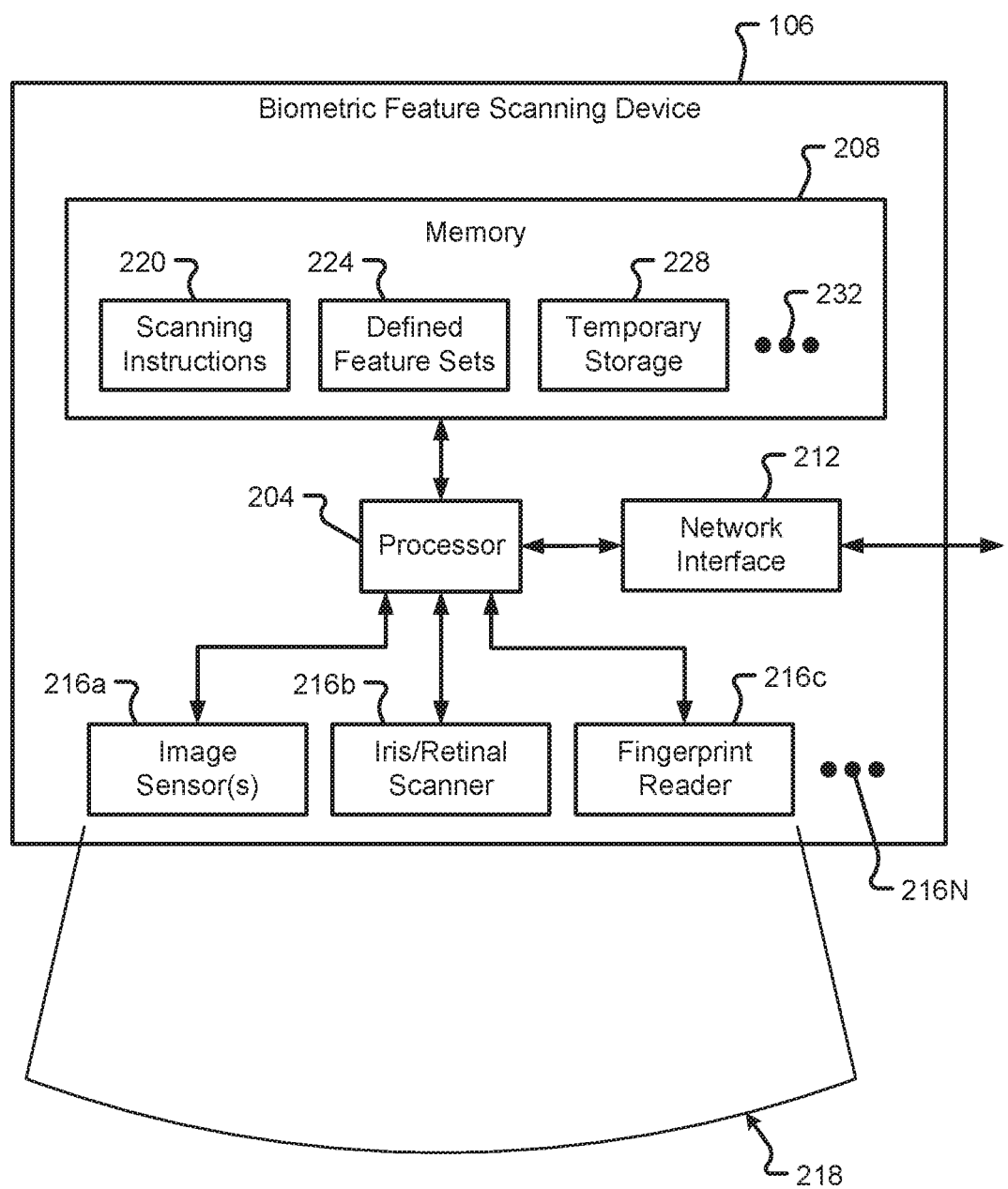
FIG. 2 is a block diagram depicting an illustrative biometric feature scanning device in accordance with embodiments of the present disclosure.

FIG. 2 is a block diagram depicting an illustrative biometric feature scanning device 106 in accordance with at least some embodiments of the present disclosure. The biometric feature scanning device 106 may include a processor 204, a memory 208, a network interface 212, and one or multiple scanning devices 216. In some embodiments, the processor 204 may be similar or identical to the processor 120. For example, the processor 204 may correspond to one or many microprocessors, CPUs, microcontrollers, or the like. The processor 204 may be configured to execute one or more instruction sets or rules 232 stored in memory 208.

The network interface 212 may also be similar or identical to network interface 128. The nature of the network interface 212, however, may depend upon whether the network interface 212 is provided in a stand-alone biometric feature scanning device 106, in a gaming device 108, a mobile user device, or some other machine that interfaces with one or more devices in the gaming system 100. Examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the biometric feature scanning device 106 is connecting to a single communication network 104 or multiple different types of communication networks 104. For instance, the biometric feature scanning device 106 may be provided with both a wired network interface and a wireless network interface without departing from the scope of the present disclosure.

The scanning devices 216 may include any device configured to detect a biometric feature of an individual within a scanning zone 218. The scanning zone 218 may correspond to a reading or detection distance from the scanning devices 216. Although the biometric feature scanning device 106 may only require one scanning device 216 to obtain biometric information about an individual in order to generate an impersonal gaming account and player ID, embodiments of the present disclosure anticipate that the biometric feature scanning device 106 can include multiple scanning devices 216. The scanning devices 216 may include, but are in no way limited to, one or more image sensors 216*a*, iris/retinal scanners 216*b*, fingerprint reader 216*c*, and/or other scanning devices 216N.

The image sensors 216*a* may include one or more cameras that are capable of obtaining image data of subject individual. In one embodiment, the image sensors 216*a* may obtain two-dimensional or three-dimensional data for an individual within the scanning zone 218. Two-dimensional data may be detected by at least one image sensor 216*a* and used by the processor 204 to map a number of biometric features, sizes of biometric features, and/or distances between biometric features for an individual, in two dimensions (e.g., along an X-axis and along a Y-axis, orthogonal to the X-axis, etc.). In addition to the two-dimensional data, three-dimensional data may be detected by at least two image sensors 216*a* and used by the processor 204 to determine a depth or range distance of various biometric features, or parts of biometric features, for the individual (e.g., along a Z-axis that extends along an axis that is perpendicular to a plane defined by the X-axis and the Y-axis, such as the XY-plane). In any event, the data obtained from the one or many image sensors 216*a* may be stored as numbers in a biometric feature template. The template may comprise dedicated memory locations for specific biometric information (e.g., measurements of and/or between recognized biometric features, etc.). This template may be stored with an impersonal player ID in the impersonal player profile database 148. The biometric information in the template may characterize an identity of a player 112, without storing identity information about the player 112. This identity may be used to differentiate between players 112 in the gaming system 100.

The iris/retinal scanner 216*b* may comprise an image sensor, light, and/or laser configured to measure features of a person's eye. In one embodiment, the iris/retinal scanner 216*b* may obtain pattern information from blood vessels on the retina of the eye. In some embodiments, the iris/retinal scanner 216*b* may obtain images of the iris of a person's eye via at least one infrared or other image sensor. The images may define pattern information about features of the iris including, but in no way limited to, color, shape, location, of portions of the iris. Similar to the data obtained by the image sensors 216*a*, the data obtained from the iris/retinal scanner 216*b* may be stored as numbers in a biometric feature template. The template may comprise dedicated memory locations for specific biometric information (e.g., measurements of and/or between recognized biometric features, etc.). This template may be similarly stored and associated with an impersonal player ID to differentiate between players in the gaming system 100.

The fingerprint reader 216*c* may comprise an optical scanner system or a capacitive scanning sensor that are configured to detect and measure distances between features of a human finger or hand print. The fingerprint reader 216*c* may determine a number of biometric features associated with a print, such as a number, size, and location of valleys, ridges, bifurcations, minutiae, and/or other features. This biometric information may be used to characterize a pattern for a print that may uniquely identify an individual. Similar to the data obtained by the image sensors 216*a* and the iris/retinal scanner 216*b*, the data obtained from the fingerprint reader 216*c* may be stored as numbers in a biometric feature template. The template may comprise discrete memory locations for specific biometric information in the pattern (e.g., measurements of and/or between recognized biometric features, etc.). This template may be similarly stored and associated with an impersonal player ID to differentiate between players 112 in the gaming system 100.

Activities of the biometric feature scanning device 106 related to obtaining biometric information from an individual in a scanning zone 218 of the scanning devices 216 may be managed and reported by the scanning instruction set 220. In one embodiment, when a player 112 is present within a scanning zone 218 of one or more scanning devices 216, the scanning instructions 220 may initiate a scan of the player 112 for biometric information. Other scanning triggers may include continually scanning, periodic scanning, or condition-based scanning. Condition-based scanning may initiate a scan of an individual upon enrolling in an offer, accepting an award, and/or cashing-out or redeeming a ticket/voucher. In any event, the biometric information may be obtained by the scanning instruction set 220 and reported to the gaming server 116. It is an aspect of the present disclosure that the scanning instruction set 220 may update records stored in the impersonal player profile database 148, the ticket/voucher database 152, and/or other memory devices in the gaming system 100.

The memory 208 may be similar or identical to memory 124. For instance, the memory 208 may include one or multiple computer memory devices that are volatile or non-volatile. The memory 208 may be configured to store instruction sets that enable scanning of individuals within the scanning zone of the biometric feature scanning device 106, feature definition templates, temporary storage data, or other rules 232. Once example of an instruction set that may be stored in the memory 208 may include a scanning instruction set 220. Additionally or alternatively, the memory 208 may include a number of defined feature sets 224 for particular biometric features that are scanned by the scanning devices 216. These defined feature sets 224 may include groups of features, patterns, shapes, and relationships between biometric features for facial recognition via image sensors 216*a*, eye scanning via an iris/retinal scanner 216*b*, and fingerprint reading via a fingerprint reader 216*c*. The feature sets may include recognition patterns, established shapes, nomenclature, or memory storage locations in a template to follow when obtaining biometric information from an individual.

A temporary storage location 228 in the memory 208 may be used to temporarily store image information or a data set associated with the biometric features of a person while the processor 204, in conjunction with the scanning instructions 220, determines biometric information representing measurements and/or other characteristics of the biometric features. This temporary storage location 228 may be deleted and/or overwritten when the biometric information is obtained from the image information or data set to ensure no identity information is saved in the gaming system 100. In some embodiments, the biometric information obtained from a person may be stored in one or more memory locations in the memory 208 of the biometric feature scanning device 106.

Figure 3:
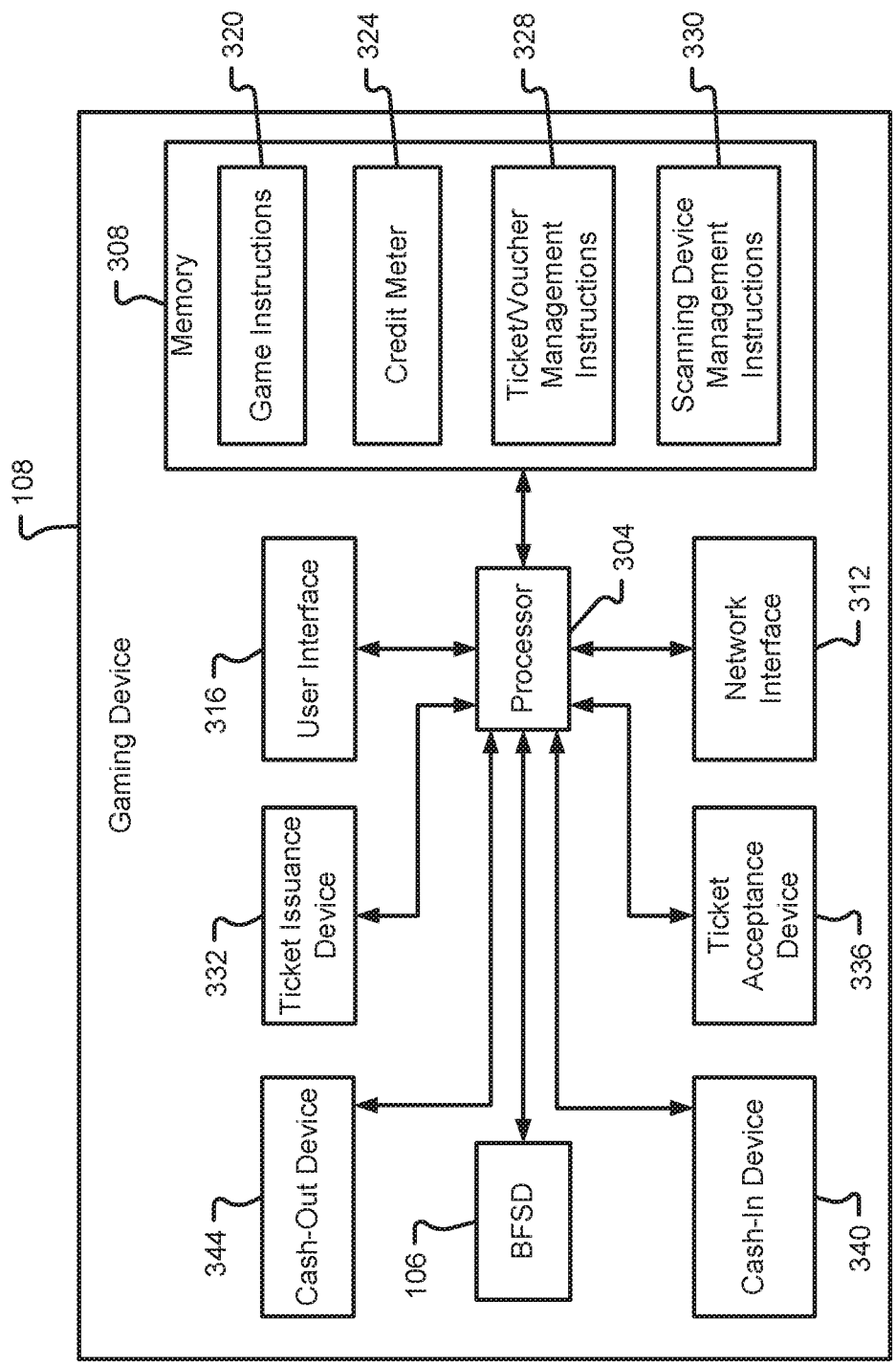
FIG. 3 is a block diagram depicting an illustrative gaming device in accordance with embodiments of the present disclosure.

With reference now to FIG. 3, additional details of a gaming device 108 will be described in accordance with at least some embodiments of the present disclosure. While depicted as a gaming device 108, it should be appreciated that some or all of the components of the gaming device 108 may be included in a player's 112 mobile device without departing from the scope of the present disclosure.

The gaming device 108 is depicted to include a biometric feature scanning device 106, a processor 304, memory 308, a network interface 312, a user interface 316, a ticket issuance device 332, a ticket acceptance device 336, a cash-in device 340, and a cash-out device 344. In some embodiments, the processor 304 may be similar or identical to the processor 120. In other words, the processor 304 may correspond to one or many microprocessors, CPUs, microcontrollers, or the like. The processor 304 may be configured to execute one or more instruction sets stored in memory 308.

The network interface 312 may also be similar or identical to network interface 128. The nature of the network interface 312, however, may depend upon whether the network interface 312 is provided in a gaming device 108 or a mobile user device. Examples of a suitable network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

In some embodiments, a stand-alone biometric feature scanning device 106 may communicate with the gaming device 108 via the network interface 312. However, the gaming device 108 may also include a biometric feature scanning device 106 that is configured to scan a player 112 within the scanning zone 218 as described in conjunction with FIG. 2. The integrated biometric feature scanning device 106 may include a processor 204 and memory 208 or utilize at least one of the processor 304 and the scanning device management instructions 330 stored in the memory 308 of the gaming device 108.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle", a speaker, or combinations thereof. If the gaming device 108 is a digital device, then the user interface 316 may include one or more touch-sensitive displays, LED/LCD display screens, etc.

The memory 308 may be similar or identical to memory 124. For instance, the memory 308 may include one or multiple computer memory devices that are volatile or non-volatile. The memory 308 may be configured to store instruction sets that enable player 112 interaction with the gaming device 108, that enable game play at the gaming device 108, and/or that enable coordination with the gaming server 116. Examples of instruction sets that may be stored in the memory 308 include a game instruction set 320, a credit meter 324, a ticket/voucher management instruction set 328, and a scanning device management instruction set 330.

In some embodiments, the game instructions 320, when executed by the processor 304, may enable the gaming device 108 to facilitate one or more games of chance or skill and produce interactions between the player 112 and the game of chance or skill. In some embodiments, the game instructions 320 may include subroutines that present one or more graphics to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., game management server, gaming server 116, or the like), subroutines for enabling the player 112 to engage in a game using their mobile user device, and any other subroutine or set of instructions that facilitate gameplay at or in association with the gaming device 108.

The credit meter 324 may correspond to a secure instruction set and/or data structure within the gaming device 108 that facilitates a tracking of activity at the gaming device 108. In some embodiments, the credit meter 324 may be used to store or log information related to various player 112 activities and events that occur at the gaming device 108. The types of information that may be maintained in the credit meter 324 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108. In some embodiments, the credit meter 324 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter 324 may be updated in response to outcomes of a game of chance or skill played at the gaming device 108. In some embodiments, the credit meter 324 may be updated depending upon whether the gaming device 108 is issuing a ticket/voucher, being used as a point of redemption for a ticket/voucher, and/or any other activity associated with a ticket/voucher. Some or all of the data within the credit meter 324 may be reported to the gaming server 116, for example, if such data applies to a centrally-managed game and/or a status of a ticket/voucher. As an example, the number, value, and timing of wagers placed by a particular player 112 and payouts on such wagers may be reported to the gaming server 116.

Activities of the gaming device 108 related to ticket/voucher activity may be managed and reported by the ticket/voucher management instruction set 328. In some embodiments, when a ticket/voucher is redeemed at the gaming device 108 by the player 112, information associated with the ticket/voucher may be obtained by the ticket/voucher management instruction set 328 and reported to the gaming server 116. Furthermore, the ticket/voucher management instruction set 328 may be configured to update the credit meter 324 if the redeemed ticket/voucher is determined to be in a redeemable state and has a redeemable or redemption value associated therewith. In some embodiments, the credit meter 324 may be updated or incremented by the redeemable or redemption value of the ticket/voucher when redeemed. This information may be obtained directly from the ticket/voucher or may require some interactions with the gaming server 116 prior to updating the credit meter 324.

In some embodiments, the ticket/voucher management instruction set 328 may work with the scanning device management instruction set 330 to determine an impersonal player ID associated with a ticket/voucher. In one embodiment, prior to issuing a ticket/voucher, the gaming device 108 may determine the impersonal player ID of a player 112 at the gaming device 108 by initiating a scan of the player 112 via the biometric feature scanning device 106. If no impersonal player ID exists for the player 112, the scanning device management instruction set 330 may report the biometric information for the player 112 to the gaming server 116. In some embodiments, the gaming server 116 may generate the impersonal player ID, which can be stored in a memory of the gaming server 116, a memory of the gaming device 108, and/or in the impersonal player profile database 148. Additionally or alternatively, the gaming device 108 may generate the impersonal player ID, which can be stored in a memory of the gaming device 108, a memory of the gaming server 116, and/or in the impersonal player profile database 148. Upon issuing a ticket/voucher, the ticket/voucher management instruction set 328 may print the impersonal player ID on the ticket/voucher or store the impersonal player ID for the ticket/voucher in the ticket/voucher database 152. When a player 112 attempts to redeem the ticket/voucher at a gaming device 108 or other cash-out machine, an associated biometric feature scanning device 106 may be directed by the ticket/voucher management instruction set 328 and/or the scanning device management instruction set 330 to scan the player for biometric information. This information may be compared to the biometric information stored on the impersonal player profile database 148 to retrieve an impersonal player ID and determine whether the impersonal player ID for the scanned player is the same as the impersonal player ID associated with the ticket/voucher. In some embodiments, this verification may include the gaming device 108 accessing the ticket/voucher database 152 to determine an impersonal player ID stored with the ticket/voucher.

Activities of the integrated biometric feature scanning device 106, for instance, related to obtaining biometric information of an individual within a scanning zone 218 of the biometric feature scanning device 106 may be managed and reported by the scanning device management instruction set 330. In one embodiment, the scanning device management instruction set 330 may be similar, if not identical, to the scanning instructions 220 described in conjunction with FIG. 2.

Because the gaming device 108 may be used for the acceptance and issuance of tickets/vouchers, the gaming device 108 may be provided with appropriate hardware to facilitate such acceptance and issuance. Specifically, the gaming device 108 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a physical ticket acceptor, a shredder, etc. The ticket acceptance device 336 may be configured to accept physical tickets and/or electronic tickets without departing from the scope of the present disclosure. An electronic ticket/voucher may be accepted by scanning a one-dimensional barcode, two dimensional barcode, or other type of barcode or quick response (QR) code displayed by a player's 112 mobile device, for example. In one embodiment, an impersonal player ID may be present on the electronic ticket/voucher as part of the barcode, QR code, or other visible information on the electronic ticket/voucher.

The ticket issuance device 332 may be configured to print or provide physical tickets/vouchers to players 112. In some embodiments, the ticket issuance device 332 may be configured to issue a ticket/voucher consistent with an amount of credit available to a player 112, possibly as indicated within the credit meter 324. Additionally or alternatively, the impersonal player ID may be printed on the ticket/voucher similar to the presentation on the electronic ticket/voucher.

The cash-in device 340 may include a bill acceptor, a coin acceptor, a chip acceptor or reader, or the like. In some embodiments, the cash-in device may also include credit card reader hardware and/or software. The cash-out device 344, like the ticket issuance device 322, may operate and issue cash, coins, physical tokens, or chips based on an amount indicated within the credit meter 324. In some embodiments, the cash-out device 344 may include a coin tray or the like and counting hardware configured to count and distribute an appropriate amount of coins or physical tokens based on a player's 112 winnings or available credit within the credit meter 324.

Figure 4A:
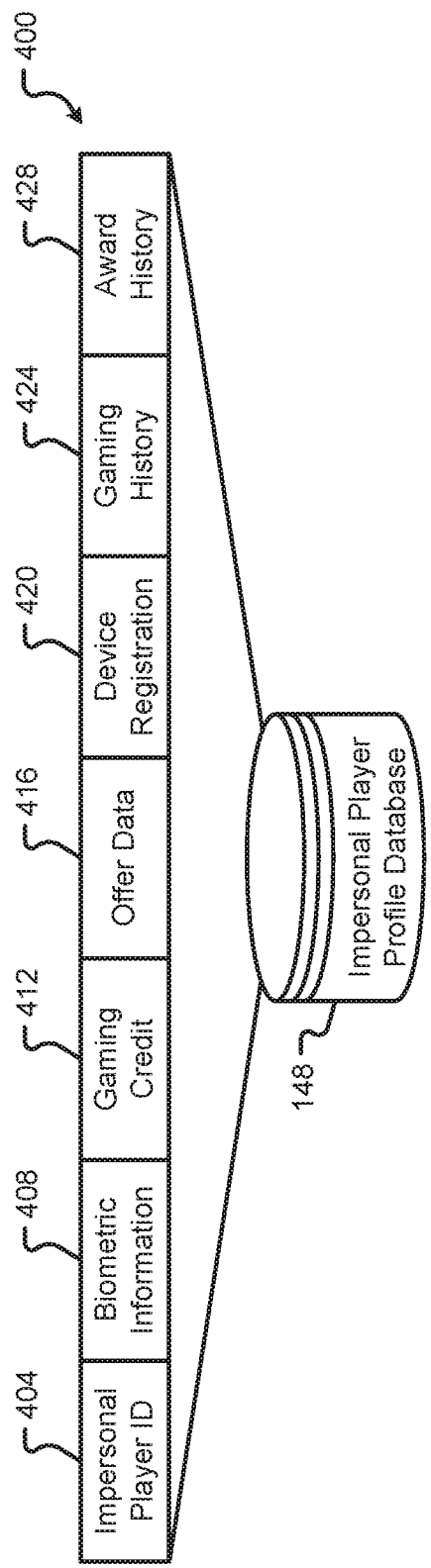
FIG. 4A is a block diagram depicting a first illustrative data structure used in accordance with embodiments of the present disclosure.
Figure 4B:
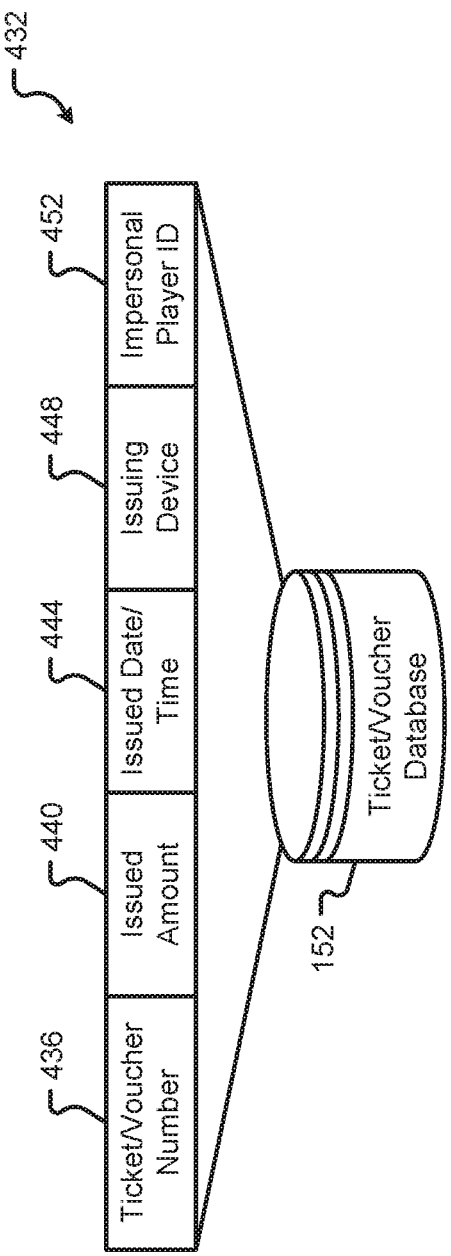
FIG. 4B is a block diagram depicting a second illustrative data structure used in accordance with embodiments of the present disclosure.

With reference now to FIGS. 4A and 4B, additional details of data structures that are useable in connection with managing impersonal player profiles and ticket/voucher redeemability will be described in accordance with at least some embodiments of the present disclosure. It should be appreciated that the data structures depicted and described herein may be stored within a central database or may be distributed among a number of data storage nodes. Additionally or alternatively, some or all of the fields of the data structures may be maintained in devices of the gaming system 100 such as the gaming server 116, a biometric feature scanning device 106, a gaming device 108, and/or a mobile device without departing from the scope of the present disclosure.

With reference initially to FIG. 4A, details of a data structure 400 that may be maintained as part of an impersonal player profile will be described in accordance with at least some embodiments of the present disclosure. Although shown as stored in the impersonal player profile database 148, it should be appreciated that the impersonal player profile data structure can be stored in a memory of the gaming device 108, a memory of the gaming server 116, and/or in the impersonal player profile database 148. The database 148 may be configured to store one or multiple data structures 400 that are used in connection with tracking player 112 progress and gaming history. As a non-limiting example, the data structure 400 may be used to store player loyalty information, player history information, and the like. Even more specifically, the data structure 400 may include a plurality of data fields that include, for instance, an impersonal player ID field 404, a biometric information field 408, a gaming credit field 412, an offer data field 416, a device registration field 420, a gaming history field 424, and an award history field 428.

The impersonal player ID field 404 may be used to store any type of information that impersonally identifies a player 112. In some embodiments, the impersonal player ID field 404 may store an identification character (e.g., number, letter, and/or symbol) and/or a string of characters that uniquely identify one player 112 from another in the database 148, without using identity information. Identity information may include a person's name, nickname, address, contact information, credit card information, social security number, national identification number, mobile device name, internet access IP address, PII, and/or any other information that could be used to discover an identity of the person. In some embodiments, the impersonal player ID field 404 may be a number assigned to a memory location of a data structure 400 in the impersonal player profile database 148. In some embodiments, the data stored in the impersonal player ID field 404 may be randomly generated, pseudo-randomly generated, or sequentially generated based on when an impersonal gaming account for a player 112 is created (e.g., after a first scan of the player 112 for biometric information, etc.). Each player 112 can have a unique memory location, and impersonal player ID in the database 148, for storing information about the player 112 other than identity information. In some embodiments, the impersonal player ID stored in the impersonal player ID field 404 may be automatically assigned to the player 112, for example, without input from the player 112.

The biometric information field 408 may be used to store information about certain biometric features of a player 112. Rather than include an image of the player 112 (e.g., photograph, video, etc.), or an image of a part of the player 112 (e.g., fingerprint, iris, retina, etc.), the biometric information field 408 may include information about a type, size, relationship, pattern, aspect, and/or ratio of a player's biometric features. For instance, a player's 112 facial biometric information may be stored as a set of numbers defining the measurement of a height of the eyes, a width of the eyes, a distance between the eyes, a distance from an eye to the nose, an area defined between the eyes and the nose, etc. The set of numbers may be stored in a template where each measurement is stored in order. As can be appreciated, this information may be used to identify one player 112 from another in the database 148 but cannot be used to personally identify the player 112 outside of the database 148 (e.g., by linking the set of numbers to a name, address, contact information, or other identity information).

The gaming credit field 412 may be used to store data about a player's 112 available credit with a device, with a sports book, with a casino, and/or with a plurality of casinos. For instance, the gaming credit field 412 may store an electronic record of available credit in the player's 112 impersonal gaming account and whether any restrictions are associated with such credit. The gaming credit field 412 may further store information describing a player's 112 available credit over time, wagers placed by the player 112, The offer data field 416 may be used to store data about offers the player 112 has participated in, is currently enrolled in, and the like. The offer data field 416 may be used to alter a gaming behavior of a gaming device 108 the player 112 is interacting with at any given time. Additionally or alternatively, the offer data field 416 may be used to alter a gaming credit stored in the gaming credit field 412 of the impersonal player profile database 148.

The device registration field 420 may be used to store data about the various gaming devices 108a-N used by the player 112 over time. In some embodiments, each gaming device 108 may include a device identifier (e.g., a hardware identification, MAC address, IP address, or other unique serial number) that uniquely identifies one gaming device 108 from another in the gaming system 100. Among other things, the device registration field 420 may record preferred gaming devices 108, frequently used gaming devices 108, and/or associate a particular gaming device 108 with issued ticket/vouchers, winning events, cash-out events, and the like. In some cases, the device registration field 420 may be used to establish a playing behavior or preferences for the player 112 having the impersonal player ID.

The gaming history field 424 may be used to store historical data for events that occur with respect to the player 112 while gaming. For instance, the gaming history field 424 may store information related to a player's 112 outcome in a game of chance, a player's 112 outcome in a game of skill, a celebration event for a person other than the player 112, a player's 112 involvement in a celebration event, a player 112 visiting a predetermined location, a player 112 playing a particular game, a player interacting with their mobile device, wagers placed by the player 112, tickets/vouchers issued for the player 112, tickets/vouchers redeemed by the player 112, etc.

The award history field 428 may be used to store information associated with cash-out events for the player, winning events for the player, tickets/vouchers issued to the player, offer win percentages, overall awards won, and the like.

With reference now to FIG. 4B, details of another data structure 432 that may be used within the gaming system 100 will be described in accordance with at least some embodiments of the present disclosure. The database 152 may be configured to store one or multiple data structures 432 that are used in connection with tracking ticket/voucher status, value, and the like. In some embodiments, the data stored in the data structure 432 may be stored for a plurality of different tickets/vouchers and may or may not be organized based on events, player association, etc. As a non-limiting example, the data structure 432 may be used to store ticket/voucher status information, ticket/voucher value information, and the like. Even more specifically, the data structure 432 may include a plurality of data fields that include, for instance, a ticket/voucher number field 436, an issued amount field 440, an issued date/time field 444, an issuing device field 448, and an impersonal player ID field 452. It should be appreciated that the data structure 432 may have greater or fewer fields than depicted in FIG. 4B.

The ticket/voucher number field 436 may be used to store a unique validation number assigned to the ticket/voucher when a ticket/voucher is issued to a player 112. In some embodiments, the data stored in the ticket/voucher number field 436 may be randomly generated, pseudo-randomly generated, or sequentially generated based on when the ticket/voucher is issued. In some embodiments, the validation number assigned to the ticket/voucher may be unique to the ticket/voucher within the gaming system 100 (e.g., at least unique as to any other ticket/voucher issued within the gaming system 100). While numeric values may be used for the validation number, it should be appreciated that any alphanumeric string may be used for the validation number stored in the ticket/voucher number field 436.

The issued amount field 440 may be used to store an electronic record of a monetary value for which the particular ticket/voucher was issued. The issued amount field 440 may correspond to a data field that is written once and not updated. Thus, even when an associated ticket/voucher transitions from the issued state to another state, the value recorded in the issued amount field 440 may be left unchanged. Likewise, the information stored in the issued date/time field 444 and issuing device field 448 may also be written once and not changed thereafter. The issued date/time field 444 may store information describing when a ticket/voucher is issued whereas the issuing device field 448 may store information describing where a ticket/voucher is issued. For instance, the issuing device field 448 may indicate a unique serial number assigned to a gaming device 108 that was used to issue the ticket/voucher to the player 112 and the issued date/time field 444 may store the time at which the ticket/voucher was issued by the gaming device 108. In some embodiments, the issued date/time field 444 may be populated based on a clock of the gaming device 108 that issued the ticket/voucher rather than relying on the clock of the gaming server 116. Said another way, when a gaming device 108 issues a ticket/voucher, such information may be communicated back to the gaming server 116 along with a timestamp provided by the gaming device 108 to indicate a time at which the gaming device 108 issued the ticket/voucher. Using the time indicated by the gaming device 108 can help account for or avoid problems associated with delays in communication over the communication network 104. One such possible problem would be having a wagered event (e.g., a sporting event) come to completion while the communication network 104 is down or unavailable and before the gaming server 116 becomes aware of an issued ticket/voucher by a gaming device 108. Of course, it may also be possible or desirable to use the clock of the gaming server 116 as the centralized authority on all date/times entered into the field 444, thereby avoiding the need to synchronize or consideration synchronization issues between various gaming devices 108a-N.

Like the issuing device field 448, the impersonal player ID field 452 may be used to store information identifying a player 112 who is associated with ticket/voucher. This identification may be the impersonal player ID from the impersonal player ID field 404 of the impersonal player profile database 148. In one embodiment, the impersonal player ID 452 may comprise a link to the impersonal player ID field 404 of the impersonal player profile database 148.

In some embodiments, only players 112 to whom a ticket/voucher was issued may redeem the ticket/voucher. This player-specific authorization guards against fraud and protects against the unauthorized redemption of lost or stolen tickets/vouchers. For instance, a player 112 may attempt to redeem a ticket/voucher at a gaming device 108 by first inserting a printed ticket/voucher into a ticket acceptance device of the gaming device 108 (e.g., similar to a bill acceptor) or by scanning the ticket/voucher with a camera of a mobile device. Upon reading the ticket/voucher, the gaming device 108 or the mobile device may either read the impersonal player ID on the ticket/voucher or communicate across the communication network 104 with the ticket/voucher database 152 to determine the impersonal player ID for the ticket/voucher from the impersonal player ID field 452. Next, the player 112 presenting the ticket/voucher may be scanned for biometric information and an impersonal player ID may be retrieved, if it exists, from the impersonal player profile database 148. If the impersonal player ID for the player 112 presenting the ticket/voucher matches the impersonal player ID for the player 112 recorded in the impersonal player ID 452 or printed on the ticket/voucher, the player 112 will be allowed to redeem the amount of the ticket/voucher. However, if no impersonal player ID exists for the player 112, or if the impersonal player ID retrieved from the impersonal player profile database 148 fails to match the impersonal player ID for the player 112 recorded in the impersonal player ID 452 or printed on the ticket/voucher, then the player 112 will be prevented from redeeming the amount of the ticket/voucher. In some embodiments, the gaming server 116 may alert the player 112 presenting the ticket/voucher of the mismatch. Additionally or alternatively, the gaming server 116 may record the unauthorized redemption attempt and create a new record for the player 112 in the impersonal player profile database 148.

Figure 5:
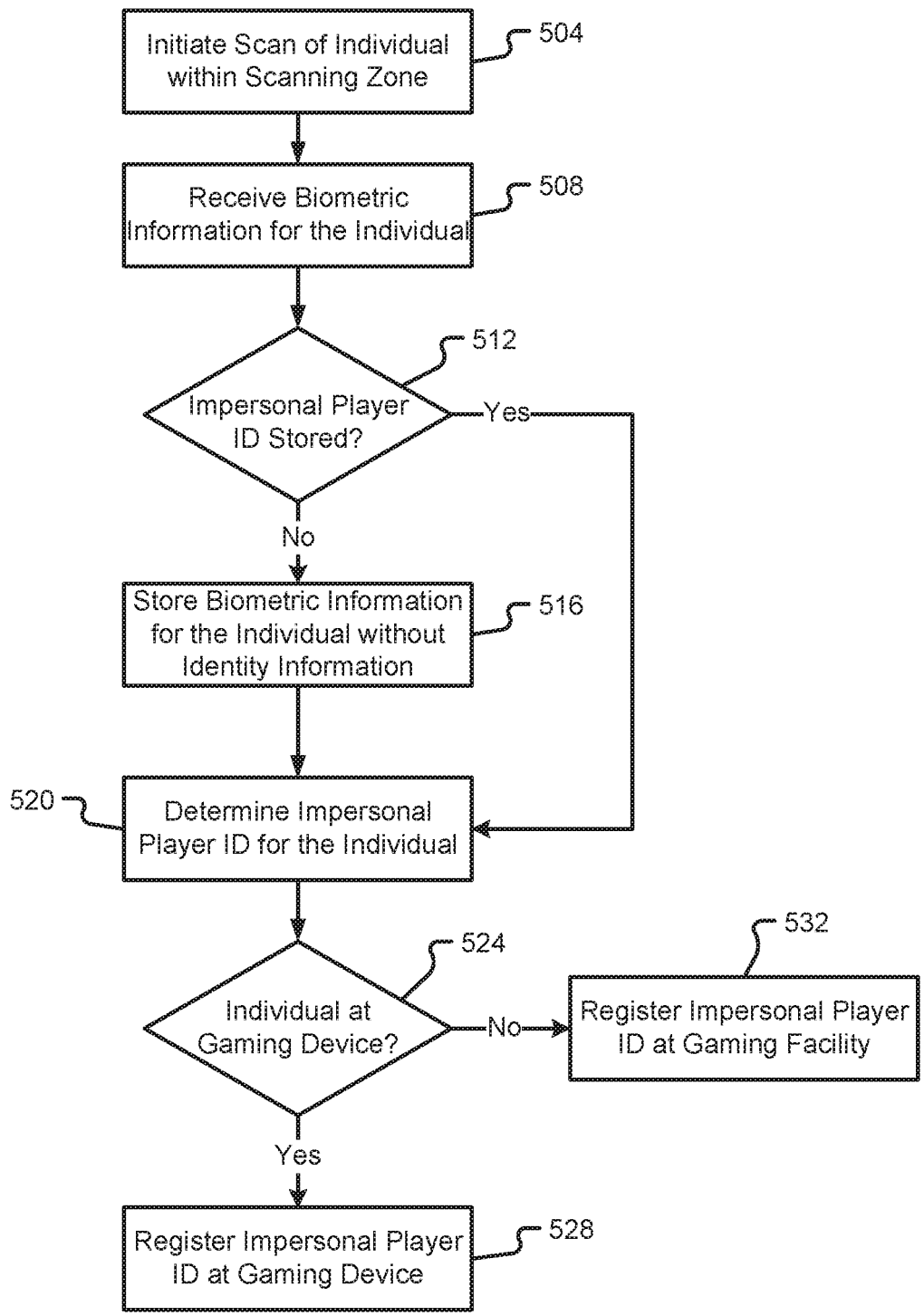
FIG. 5 is a flow diagram depicting a method of determining an impersonal player identification based on a biometric scan of an individual in accordance with embodiments of the present disclosure.

With reference now to FIG. 5, a first method of managing tickets/vouchers will be described in accordance with at least some embodiments of the present disclosure. The method begins when a scan for biometric information associated with an individual is initiated (step 504). In some embodiments, the scan may be automatically initiated when the individual enters the scanning zone 218 of a biometric feature scanning device 106 in a gaming system 100. This may include an individual sitting or standing in front of one or many image sensors 216a, positioning their eyes in front of an iris/retinal scanner 216b, and/or placing a finger onto a fingerprint reader 216c. In one embodiment, the scan may be initiated in response to a registration, or login, attempt by a player 112 at a gaming device 108. As described herein, the scanning of individuals within the scanning zone 218 may be performed with or without explicit consent from the individuals or even knowledge of the scanning.

The scan of the individual may be performed by the biometric feature scanning device 106 to determine patterns, sizes, ratios, and the like, between biometric features of the individual. This information may be converted by the biometric feature scanning device 106 into numerical data defining the biometric information for the individual, for instance, without use of any identity information as described in conjunction with FIGS. 1-4B.

The method continues upon receiving the biometric information from the biometric feature scanning device 106 (step 508). In some embodiments, the biometric information may be arranged in a biometric information template as described herein. The biometric information template may comprise discrete memory locations for specific measurement information associated with biometric features.

The method continues by determining whether an impersonal player ID for the scanned individual is associated with the biometric information and stored as part of an impersonal player profile data structure 400, which may or may not be stored in the impersonal player profile database 148 of the gaming system 100 (step 512). In some embodiments, this step may include the biometric feature scanning device 106 or the gaming device 108 reporting the biometric information to the gaming server 116. In response, the gaming server 116 may access the impersonal player profile database 148 and compare the biometric information for the scanned individual against records in the biometric information field 408 of the first data structure 400 for registered players. When a match exists, the gaming server 116 reports the impersonal player ID for the biometric information to the device 106, 108. When there is no match, the method may proceed to generate an impersonal player ID and create a record in the impersonal player profile database 148 for the scanned individual (step 516).

In step 516, the gaming server 116 stores the biometric information for the scanned individual in a biometric information field 408 associated with an unused impersonal player ID. This impersonal player ID is maintained in the impersonal player ID field 404 of the impersonal player profile database 148, and any impersonal records, such as gaming credit, offer data, devices used, gaming history, award history, and the like associated with the scanned individual is stored in the memory location identified by the impersonal player ID.

It is an aspect of the present disclosure that the impersonal player ID and the first data structure 400 represents an impersonal gaming account for a player 112. This impersonal gaming account may be completely absent of any identity information for the player 112 (e.g., other than the biometric information obtained from the player 112). For instance, the impersonal gaming account may include playing history, settings, information, and identifiers that could not otherwise be used to identify the player 112. In fact, the biometric information stored in the biometric information field 408 only includes numerical measurement, pattern, and/or template data. As can be appreciated, this information could not be used to recreate identity information of a player 112 and may only be used to describe a player 112 in general terms outside of the gaming system 100. In some embodiments, the impersonal gaming account may not even include a link to identity information or other memory locations having identity information for the player 112.

The method continues by determining the impersonal player ID for the player 112 (step 520). This determination may include receiving the impersonal player ID from the gaming server 116 or directly accessing the impersonal player profile database 148 and retrieving the impersonal player ID therefrom.

As previously described, a player 112 may be scanned by a stand-alone biometric feature scanning device 106 or by a biometric feature scanning device 106 integrated into a gaming device 108. The player 112 may be registered with a device (e.g., gaming device 108) or a facility (e.g., casino, etc.) based on the device that scanned the player 112. The method may continue by determining whether the player 112 is at a gaming device 108 (step 524). If so, the gaming device 108 may register the player's 112 impersonal player ID at the gaming device 108 (step 528). In some embodiments, this registration may include reporting the presence of the player 112 at the gaming device 108 to the gaming server 116. In one embodiment, the gaming device 108 or the gaming server 116 may update a device registration record stored in the device registration field 420 of the first data structure 400 for the player 112.

On the other hand, if the player 112 is not at a gaming device 108, the player 112 may be determined to be at a facility registration kiosk, stand-alone biometric feature scanning device 106, or other registration machine. In response, the method may register the player at the gaming facility (step 532). In one embodiment, the facility registration may include reporting the presence of the player 112 at a registration device to the gaming server 116. In some jurisdictions a player 112 may be required to pre-register before being allowed to enter a casino. This pre-registration may be made at the stand-alone biometric feature scanning device 106 and in accordance with step 532 of the method.

Figure 6:
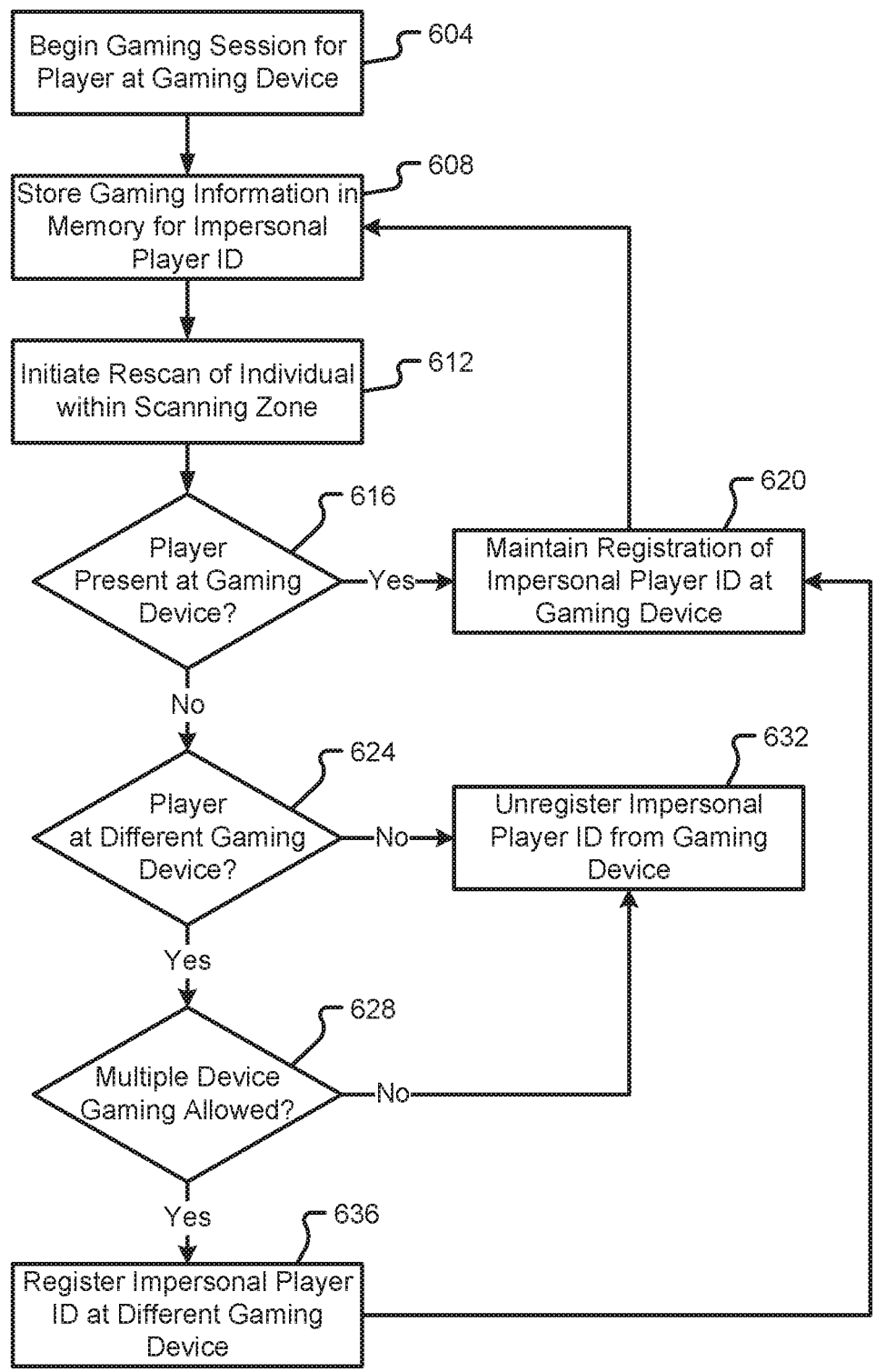
FIG. 6 is a flow diagram depicting a method of verifying the presence of an individual at a gaming device based on impersonal biometric identification information in accordance with embodiments of the present disclosure.

Referring now to FIG. 6, a flow diagram depicting a method of verifying the presence of an individual at a gaming device 108 based on impersonal biometric identification information is described in accordance with at least some embodiments of the present disclosure. The method begins once a player 112 has initiated a gaming session at a gaming device 108 (step 604). This may include pressing a "start" button, placing a bet, pulling a handle of a slot machine, spinning a wheel, inserting money, accessing credit stored in a credit meter, otherwise interacting with the gaming device 108, and the like.

As the player 112 interacts with at least one game of the gaming device 108, the method continues by storing gaming information in a memory associated with the player's impersonal player ID (step 608). This type of gaming information may include any of the data described in conjunction with the data structures 400, 432 of FIGS. 4A and 4B, respectively. For instance, the gaming information may include a gaming credit, offer data, an identification of the gaming device 108, a progress of a game, a level reached in the game, awards won, bonuses achieved, and the like.

The method continues by initiating a rescan of the individual within the scanning zone 218 of the biometric feature scanning device 106 for the gaming device 108 (step 612). The rescan may be similar to the scan described in conjunction with step 504 of FIG. 5. For example, the rescan may obtain biometric information for an individual at the gaming device 108. In some embodiments, the rescan may be performed by the biometric feature scanning device 106 of the gaming device 108 on a continual or periodic basis. In some cases, the rescan may be performed in response to a condition associated with the game at the gaming device 108. By way of example, as a player 112 accumulates credit or achievements, the gaming device 108 may determine to rescan the player 112 to ensure the biometric information for the scanned player 112 matches the biometric information for the impersonal player ID registered at the gaming device 108. As another example, the gaming device 108 may determine to rescan the player 112 when the player attempts to cash-out or transfer credits from one gaming device 108 to another in the gaming system 100. These rescans serve as a security check and fraud prevention system that serves to reward or allow access only to the appropriate player 112.

The method continues by determining, based on the rescan, whether the player 112 associated with the registered impersonal player ID is present (e.g., still present) at the gaming device 108 (step 616). If so, the method continues by maintaining the registration of the impersonal player ID at the gaming device 108. However, if the gaming server 112 or the gaming device 108 determines that the biometric information obtained from the rescan fails to match the biometric information for the player 112 registered with the gaming device 108 (e.g., via the biometric information stored with the player's 112 impersonal player ID), the method proceeds to determine whether the player 112 is present at a different gaming device 108 in the gaming system 100 (step 624). In some embodiments, this determination may include the gaming device 108 or the gaming server 116 referring to the device registration field 420 of the first data structure 400 for the player 112 for current device registration information. In one embodiment, the method may determine that the player 112 is at a different gaming device 108 by a biometric feature scanning device 106 of another gaming device 108 detecting the player 112 and the gaming server 116 updating the registration of the player 112 at the different gaming device 108. If the player 112 is not present at any gaming device 108 in the gaming system 100, it may be inferred that the player 112 has left the gaming facility or does not wish to play anymore. At this point, the method may unregister the player from the gaming device 108 (step 632). Unregistering the player 112 may include entering a record into the device registration field 420 to reflect the player 112 is not currently registered with any gaming device 108.

In some embodiments, the player 112 may be determined to be at a different gaming device, at which point, the method proceeds to determine if multiple device gaming is allowed (step 628). It is an aspect of the present disclosure that a player 112 may, at times, be able to use two or more gaming devices 108 in a gaming system 100. As can be appreciated, the player 112 may not be detected by one gaming device 108 while sitting or standing at an adjacent or nearby gaming device 108. Multiple device gaming may be allowed based on the type of games offered at the gaming devices 108, information in the impersonal player profile database 148 for the player 112, facility offerings, and/or combinations thereof. If no multiple device gaming is allowed, the method proceeds by unregistering the impersonal player ID from the first gaming device 108, where the player 112 is determined not to be present. However, in the event that multiple device gaming is allowed, the method proceeds by registering the player's 112 impersonal player ID at the different gaming device 108, as well as maintaining the player's 112 impersonal player ID at the first gaming device 108.

Figure 7:
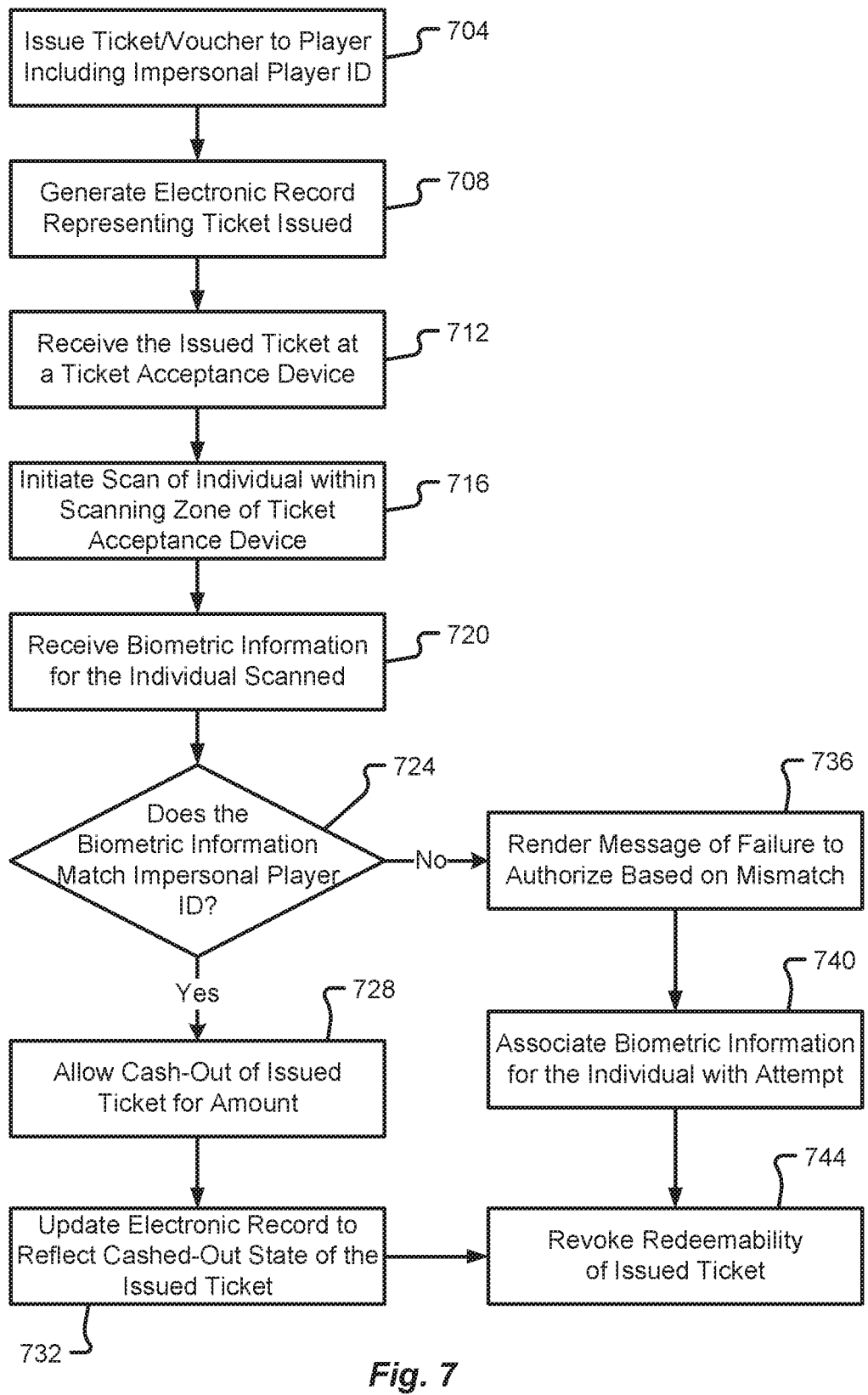
FIG. 7 is a flow diagram depicting a method of authenticating an issued ticket using impersonal biometric identification information in accordance with embodiments of the present disclosure.

FIG. 7 is a flow diagram depicting a method of authenticating an issued ticket using impersonal biometric identification information for a player 112 in accordance with at least some embodiments of the present disclosure. The method begins when a player 112 qualifies to receive a ticket/voucher (e.g., by earning credit, meeting goals, winning bets, cashing-out, etc.) and a ticket/voucher is issued, for example, by a ticket issuance device 332 (step 704). As provided above, a ticket/voucher issued by a gaming device 108 where a player 112 is registered may include the player's 112 impersonal player ID printed or displayed thereon. The impersonal player ID may be a represented as one or more numbers, characters, or symbols, or may be included and read as part of a barcode or link present on the ticket/voucher.

The method continues by generating an electronic record representing the ticket/voucher issued (step 708). The electronic record may include information associated with the issued ticket/voucher as described in conjunction with the data structure 432 stored in the ticket/voucher database 152. It is an aspect of the present disclosure that the electronic record may include a ticket/voucher number, an amount of value of the ticket/voucher, and the impersonal player ID of the player 112 to whom the ticket/voucher was issued. In some embodiments, and as described herein, the gaming device 108 in conjunction with the gaming server 116 may record, update, and alter data stored in the impersonal player profile database 148 and the ticket/voucher database 152.

The method continues when the issued ticket/voucher is received at a ticket acceptance device 336 (step 712). The ticket acceptance device 336 may be part of a gaming device 108 or a redemption kiosk at a gaming facility. In some embodiments, the ticket/voucher may be inserted into a ticket acceptance device 336 or scanned by a ticket acceptance device 336. In any event, the ticket acceptance device 336 may read the contents of the ticket/voucher and determine the impersonal player ID for a player 112 associated with the ticket/voucher. Either the gaming device 108 or the gaming server 116 may then initiate a scan of the individual within a scanning zone of a biometric feature scanning device 106 associated with the gaming device 108 or redemption kiosk (step 716). The scan may be similar to the scan described in conjunction with step 504 of FIG. 5, and may produce biometric information for the individual scanned (720).

The method continues by accessing the impersonal player profile database 148 to determine whether the biometric information for the impersonal player ID present on the ticket/voucher matches the biometric information received for the individual scanned. If the biometric information matches, the scanned individual is the player 112 to whom the ticket/voucher was issued and the method continues by allowing the cash-out of the ticket/voucher for the amount recorded in the issued amount field 440 (or listed on the ticket/voucher) (step 728). Once cashed-out, the method may optionally continue by updating a redemption field for the ticket/voucher in the ticket/voucher database 152 (step 732) and revoke further redeemability of the issued ticket/voucher (step 744).

In some embodiments, the method may determine that biometric information for the impersonal player ID present on the ticket/voucher fails to match the biometric information received for the individual scanned. In this event, the method proceeds to render a message of the failure to authorize the cash-out of the ticket/voucher (step 736). The attempted cashing-out of a ticket/voucher may be accidental or may be associated with a theft. In some embodiments, the method may proceed to associate the biometric information for the individual who attempted to cash-out the ticket with the attempt to do so (step 740). In one embodiment, this information may be stored in the award history field 428 for the individual as a suspect attempt. The gaming server 116 may review the data structure for each player 112 in a player 112 to determine whether there is a pattern of suspect attempts associated with a particular player to identify bad behavior, ban further gaming, or report the particular player to a law enforcement agency. Because the ticket/voucher may be determined to be lost or stolen, the redeemability of the issued ticket/voucher may be revoked (step 744). Although the physical ticket/voucher may not be claimed, the electronic record associated with the ticket/voucher and linked to the player 112 via the impersonal player ID may still reflect that the ticket/voucher was not redeemed. Accordingly, the player 112 may return to a ticket issuance device 332 and issue a new physical ticket for cash-out by following the scan verification procedure described herein.

In some embodiments, a player 112 may be able to redeem an award amount without the use of an issued ticket/voucher. For instance, embodiments of the present disclosure may render the use of physical tickets/vouchers unnecessary by, among other things, allowing for a credit to remain in an electronic record for the player 112 until the specific and verified player 112 chooses to cash-out. By way of example, a player 112 may win a specific amount based on games played and/or bets won over time. Upon being awarded the specific amount, the gaming server 116 may update a data structure 400 for the player 112 to include the specific amount awarded and a redemption status (e.g., redeemed, unredeemed, expired, etc.) associated with the specific amount awarded. When the player 112 is ready to cash-out, the player 112 may enter a scanning zone 218 of a biometric feature scanning device 106 (e.g., of a cash-out terminal, gaming device, etc.), where a scan of the player 112 is initiated and the biometric information for the player 112 is verified. This scan and verification process may be similar, if not identical, to the process described in conjunction with steps 716-736 above. Once the specific amount awarded is cashed-out by the player 112, the gaming server 116 may update the redemption status (e.g., stored in the data structure 400) to reflect that the specific amount awarded has been redeemed.

In addition to the embodiments described above, the present disclosure offers a number of additional benefits and features.

When logged in at a gaming device and cashing out, a cash-out ticket might be created which can only be redeemed by a player having biometric information matching the biometric information associated with an impersonal player ID in order to increase security against ticket loss or thievery. By way of example, when a ticket is inserted at a gaming device, the individual who presented the ticket may be scanned to determine, or verify, if the individual's biometrics match the biometric information for the impersonal player ID associated with (e.g., printed on, etc.) the ticket.

Aspects of the present disclosure allow for impersonal special offers to be made on the casino floor, for example, where every user can be scanned once to qualify for the offer, etc. (e.g., to receive a one-time bonus within a game per person). The offer may be in the form of free spins, special game rules, bonuses, etc. In this manner, players may win monetary and non-monetary prizes at gaming devices (e.g., dinner, a drink, concert tickets, etc.), and the prizes may be tied to the impersonal player ID for players. To redeem a prize, the player may be scanned (e.g., for the biometric information and the impersonal player ID) at the restaurant, at the bar, at the concert entrance, etc. Appropriate IT-infrastructure may provide information about biometric information and corresponding impersonal player IDs for promotions/prizes.

In some embodiments, players may be logged into multiple gaming devices at one time. In one embodiment, a player's biometrics may be scanned at EGM 1 (logged in), the player's biometrics may be scanned at EGM 2 (logged in), the gaming server or one of the two EGMs may determine that the player is logged into two EGMs at the same time and show cross-EGM transfer options. For instance, the player may be allowed to transfer cash from one EGM to another. The cross-EGM transaction may be confirmed or verified via biometric scan. If the impersonal player ID before the transaction-scan matches with the two impersonal player IDs logged in, the player will be able to proceed with the transaction. In another example, the player may be able to collect achievements at two EGMs at the same time and combine them at one EGM if desired (e.g., collect 10 parts of XY . . . 5 parts are collected at the first EGM, 5 parts are collected at the second EGM2, and through biometric verification of the player, combine both parts (of 5) to total the 10 XY at one of the two EGMs.

In some embodiments, one collective credit meter may be activated for all active machines logged into at the same time by a player. The credits of all the games may be booked from and to this credit meter. When cashing in on one active machine, all other activated machines have the same credits. In this example, the player may be required to play in an "auto play" mode on the other machines while playing on one machine.

In one embodiment, it may be required that a player play on at least two EGMs simultaneously for a "simultaneous play bonus" (e.g., two gaming devices next to one another in a bank configuration, where bonus feature presentations reach over both EGM screens, and where bonus ability is greater than playing both bonus games solitarily). In some embodiments, a player may be able to remotely play a first EGM while sitting and playing at a second EGM (e.g., on the second EGM a mini-screen of the first EGM's content and a mini-button panel may be shown, so that player can control the first EGM without physically sitting at the first EGM.

Game data may be linked to the impersonal player ID, such as game settings, game progress made, binding features collected, high scores achieved, achievements collected, etc. The player can create a new impersonal gaming account by scanning their biometric information directly at an EGM, the player is logged in to that EGM and all game data will be collected and saved to the impersonal player ID associated with the biometric information as long as the player is logged in. When logging out and logging back in either at the same EGM or another EGM, the player's biometrics are scanned and whole game data is restored based on the retrieved information from the impersonal player ID. The game data may include settings (e.g., language, volume, bet, denomination, game speed, side best, rumble features, brightness, colors, presentation, etc.). The game progress may include reel picture, binding features, free games, episodic gaming progress, levels, and/or the like. Other information may include credits, player statistics (e.g., favorite games, number of logins in a period of time, reaction timing, etc.).

In some cases, a player might login to a first machine (M1) via biometrics and an impersonal player ID and start playing a first game (G1). The player may adjust the game settings according to their needs and play as long as wanted. Then the player might logout and the settings and game progress made are saved to the impersonal gaming account associated with the impersonal player ID. Then the player may either continue to play G1 at M1 and the progress of G1 will be restored to let the player continue playing from the exact point where the last game session ended. Additionally or alternatively, the player may login to a second machine (M2) and play G1. Again, in this instance the settings and game progress of G1 may be restored from the exact end of the last session played.

In some embodiments, achievements with a particular game series may be based on the impersonal player ID, which can only be connected, once the player collected a part-achievement within each single game of the series. Player logs in to game 1 of the series and collects achievement A, the player the logs in to game 2 of the series and collects achievement B, the player then logs in to game 3 of the series and collects achievement C. Achievement A+B+C might be combined and benefitted from in each of the three games. An achievement "A" collected in game 1 might evolve to achievement "A+" when transferred and progressed in game 2. Bringing the achievement "A+" to game 3 might evolve the achievement to "A++" and so on. To bring an achievement from game 1 to another, the player may be required to login via biometric scan and the impersonal player ID prior to playing on each game. A feature or achievement may be carried from one game A to an entirely different game B. In one example, the player might login to game B and be surprised by the "random" integration of something experienced in another game (such as a personally chosen "favorite bonus symbol" which may not be a part of game B).

If a player is scanned and there is no impersonal player ID, based on the biometric information scanned, the player may be identified as "a new player" to a game. In this case, the game might trigger some tutorial-like introductions, explaining the player the most important game characteristics. The player may then be scanned and an impersonal player ID may be generated and associated with the player. Once finished, the impersonal player ID may be updated to indicate that the player is an experienced player with that game and thus, introductions are no longer necessary when the player returns to that game.

In some cases, the biometric information may initiate/allow pairing of multiple devices (EGM, smart-phone, tablet, etc.). For instance, a player may be playing a cross-channel game, such as a game being available on both a smart device (e.g., of a mobile device, a tablet, a smart wearable, etc.) and an EGM that comprise a biometric scanner. The player might play the game on the mobile device (e.g., at home) logged in with biometrics game progress after each game is saved on a server (e.g., associated with the impersonal player ID) and when the player is in the casino, the player may login based on biometric information to continue gambling on the EGM, from the exact point where the last session ended on the mobile device. This gaming information may be retrieved from the memory location associated with the impersonal player ID. The player might continue on the smart device or on the EGM whenever wanted, always with the latest game progress made and saved with the impersonal player ID.

In some embodiments, multiple EGMs and/or mobile devices may be assigned to a player's impersonal player ID allowing the player to play them simultaneously (lock devices for other players), at the same time prevent other player's from taking over an assigned and actively played machine (e.g., certain players may be playing multiple machines at the same time with auto play and sit back, watch, and wait for big wins). Newly released games may be shown to the player on the floor based on a player's gambling behavior stored in the memory location for the impersonal player ID. In some embodiments, the player may be offered to play a free trial of a new game based at least partially on this information.

It is an aspect of the present disclosure that advertisements may be shown or presented to a player based on a gambling behavior (e.g., games played most often, types of games played, amount of money played for, etc.) saved in memory and associated with the impersonal player ID. In some embodiments, a casino visitor may be scanned at a casino entrance to retrieve a casino visitation history associated with an impersonal player ID, and based on this history receive special vouchers or credits.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. An impersonal biometric identification system of a gaming facility, comprising:
 a biometric feature scanning device;
 a processor coupled to the biometric feature scanning device; and
 a memory coupled with and readable by the processor and storing therein a set of instructions that, when executed by the processor, causes the processor to:
  initiate, via the biometric feature scanning device, a biometric scan of an individual within a scanning zone of the biometric feature scanning device;
  receive, from the biometric feature scanning device and based on the biometric scan, biometric information for the individual; and
  store the biometric information for the individual in a template that defines measurement relationships of biometric features of the individual in a memory location for the individual on a memory device without storing an image of the biometric features of the individual on the memory device, wherein the template stored in the memory location for the individual is associated with an impersonal player identification (ID) that uniquely identifies the individual without any identity information other than the measurement relationships of the biometric features of the individual, and wherein the image of the biometric features of the individual cannot be recreated from the biometric information for the individual stored in the template.

2. The system of claim 1, wherein the biometric feature scanning device is part of a gaming device, wherein the gaming device is connected with a gaming communication network available to a plurality of gaming devices in the gaming facility, and wherein the memory device is connected with the gaming communication network.

3. The system of claim 1, wherein the memory device does not link to identity information for the individual and does not comprise any identity information for the individual other than the measurement relationships of the biometric features of the individual, and wherein the set of instructions further cause the processor to maintain, in association with the impersonal player ID, a common credit meter for a number of different gaming devices being played simultaneously by the individual.

4. The system of claim 1, wherein the set of instructions further causes the processor to register the individual at a gaming device for a gaming session based on the impersonal player ID.

5. The system of claim 4, wherein the set of instructions further causes the processor to:
record gaming information for the individual while the individual is at the gaming device, wherein the gaming information comprises a gaming behavior for the gaming session at the gaming device; and
store, to the memory location of the memory device, the gaming information recorded for the individual.

6. The system of claim 5, wherein the gaming information comprises a gaming type and feasible game data for the gaming session at the gaming device, and wherein the set of instructions further causes the processor to:
obtain, periodically by the biometric feature scanning device, subsequent biometric information for individuals within the scanning zone of the biometric feature scanning device; and
determine, based on the processor comparing the subsequent biometric information obtained to the stored biometric information for the individual associated with the impersonal player ID, whether the individual is present at the gaming device.

7. The system of claim 6, wherein the gaming device comprises an electronic gaming machine and wherein the set of instructions further causes the processor to unregister the impersonal player ID from the gaming device when the biometric feature scanning device fails to detect the individual as present at the gaming device.

8. A method for generating gaming device transferable gaming information using impersonal biometric information for individuals interacting with a gaming facility, the method comprising:
scanning, by a biometric feature scanning device, an individual within a scanning zone of the biometric feature scanning device for biometric information;
receiving, by a processor, from the biometric feature scanning device, the biometric information for the individual; and storing, by the processor, the biometric information for the individual in a template that defines measurement relationships of biometric features of the individual in a memory location for the individual on a memory device without storing an image of the biometric features of the individual on the memory device, wherein the template stored in the memory location for the individual is associated with an impersonal player identification (ID) that uniquely identifies the individual without any identity information other than the measurement relationships of the biometric features of the individual, and wherein the image of the biometric features of the individual cannot be recreated from the biometric information for the individual stored in the template.

9. The method of claim 8, wherein the biometric feature scanning device and the processor are part of a gaming device, and wherein storing the biometric information for the individual in the memory location comprises communicating with the memory device across a gaming communication network available to a plurality of gaming devices in the gaming facility.

10. The method of claim 9, wherein the memory device does not link to identity information for the individual and does not comprise any identity information for the individual other than the measurement relationships of the biometric features of the individual.

11. The method of claim 9, further comprising:
determining, by the processor and based on information from the biometric feature scanning device of the gaming device, that the individual is physically present at the gaming device; and
registering, by the processor and in response to determining the individual is physically present at the gaming device, the impersonal player ID for a gaming session at the gaming device.

12. The method of claim 11, further comprising:
recording, by the processor, gaming information for the individual while the individual is at the gaming device, wherein the gaming information comprises a gaming progress for the gaming session at the gaming device; and
storing, by the processor, the gaming information recorded for the individual to the memory location of the memory device.

13. The method of claim 12, wherein the gaming information comprises a gaming type and feasible game data for the gaming session at the gaming device, the method further comprising:
obtaining, periodically by the processor via the biometric feature scanning device, subsequent biometric information for individuals within the scanning zone of the biometric feature scanning device;
accessing, by the processor, the biometric information for the individual associated with the impersonal player ID registered at the gaming device;
comparing, by the processor, the biometric information for the individual to the subsequent biometric information for the individuals within the scanning zone of the biometric feature scanning device; and
determining, by the processor, based on comparison, whether the individual is present at the gaming device.

14. The method of claim 13, further comprising:
maintaining, by the processor, registration of the impersonal player ID for the gaming session at the gaming device when the individual is determined to be present at the gaming device; and unregistering, by the processor, the impersonal player ID from the gaming device when the biometric feature scanning device fails to detect the individual as present at the gaming device.

15. The method of claim 13, further comprising:
scanning, by a processor of a second gaming device, the individual within a scanning zone of a biometric feature scanning device of the second gaming device for the biometric information;
searching, by the processor of the second gaming device and based on the biometric information, the memory device for the impersonal player ID associated with the individual scanned;
registering, by the processor of the second gaming device, the impersonal player ID for a gaming session at the second gaming device.

16. The method of claim 15, further comprising:
retrieving, by the processor of the second gaming device, the gaming information for the individual from the memory location; and
determining, by the processor of the second gaming device, a presentation by the second gaming device based on the gaming information retrieved.

17. The method of claim 16, wherein the gaming device comprises an electronic gaming machine and wherein the presentation provides an option to transfer gaming information from the gaming device to the second gaming device without requiring a physical token, or vice versa.

18. The method of claim 16, wherein the presentation provides an option to transfer rewards from the gaming device to the second gaming device without requiring a physical token, or vice versa, the method further comprising:
reading, by an optical reading device of the second gaming device, an issued cash-out ticket for the individual, wherein the issued cash-out ticket comprises the impersonal player ID for the individual and a cash-out value for the cash-out ticket;
accessing, by the processor of the second gaming device and based on the impersonal player ID, the memory location for the biometric information for the individual;
scanning, by the biometric feature scanning device of the second gaming device, a person within the scanning zone of the biometric feature scanning device of the second gaming device for biometric information for the person;
comparing, by the processor of the second gaming device, the biometric information for the individual accessed to the biometric information for the person scanned;
authorizing, by the processor of the second gaming device and based on the comparison, payment of the cash-out ticket for the cash-out value when the biometric information for the individual accessed matches the biometric information for the person scanned; and
denying, by the processor of the second gaming device and based on the comparison, payment of the cash-out ticket for the cash-out value when the biometric information for the individual accessed fails to match the biometric information for the person scanned.

19. A computer gaming device, comprising:
a biometric scanner;
a processor coupled to the biometric scanner; and
a memory coupled with and readable by the processor and storing therein a set of instructions that, when executed by the processor, causes the processor to:
scan, via the biometric c biometric features of a person within a scanning zone of the biometric scanner;
receive, based on the scan, biometric information defining a relationship between the biometric features of the person scanned;
determine whether the biometric information of the person scanned is stored in a template that defines measurement relationships of the biometric feature of the the person scanned in a memory device, wherein the memory device comprises separate memory locations for previously recognized players at a gaming facility, wherein the previously recognized players are each identified by a unique impersonal player identification (ID), and wherein the memory device does not link to identity information for the previously recognized players and does not comprise any identity information for the previously recognized players other than measurement relationships of biometric features of the previously recognized player; and
in response to determining the biometric information for the person scanned is not stored in the template in the memory device, store the biometric information of the person scanned in the template in a memory location for the person scanned in the memory device without storing an image of the biometric feature of the person scanned in the memory device, wherein the memory device does not link to identity information for the person scanned and does not comprise any identity information for the person scanned other than the measurement relationships of the biometric features of the person scanned, and wherein the image of the biometric features of the person scanned cannot be recreated from the biometric information for the person scanned that is stored in the template.

20. The device of claim 19, further comprising:
an optical reading device that reads issued cash-out tickets, the cash-out tickets comprising an impersonal player ID for a recognized player at the gaming facility and a cash-out value for the cash-out ticket printed thereon; and
wherein the set of instructions further causes the processor to:
access a memory location on the memory device corresponding to a memory location for the impersonal player ID displayed on the cash-out ticket;
retrieve, from the memory location, measurement relationships of biometric features of the recognized player associated with the impersonal player ID stored as numerical data in a template for the recognized player;
initiate a scan, by the biometric scanner, of an individual within the scanning zone of the biometric scanner for biometric information for the individual comprising measurement relationships of biometric features of the individual;
compare the measurement relationships of the biometric features of the recognized player associated with the impersonal player ID to the measurement relationships of the biometric feature of the individual scanned;
authorize, based on the comparison, payment of the cash-out ticket for the cash-out value when the measurement relationships of the biometric features of the recognized player associated with the impersonal player ID matches the measurement relationships of the biometric features of the individual scanned; and deny, based on the comparison, payment of the cash-out ticket for the cash-out value when the measurement relationships of the biometric features of the recognized player associated with the impersonal player ID fails to match the measurement relationships of the biometric features of the individual scanned.

* * * * *